Sept. 13, 1960 J. T. PATH 2,952,504
FILM TIMING MARKER GENERATOR
Filed July 13, 1956
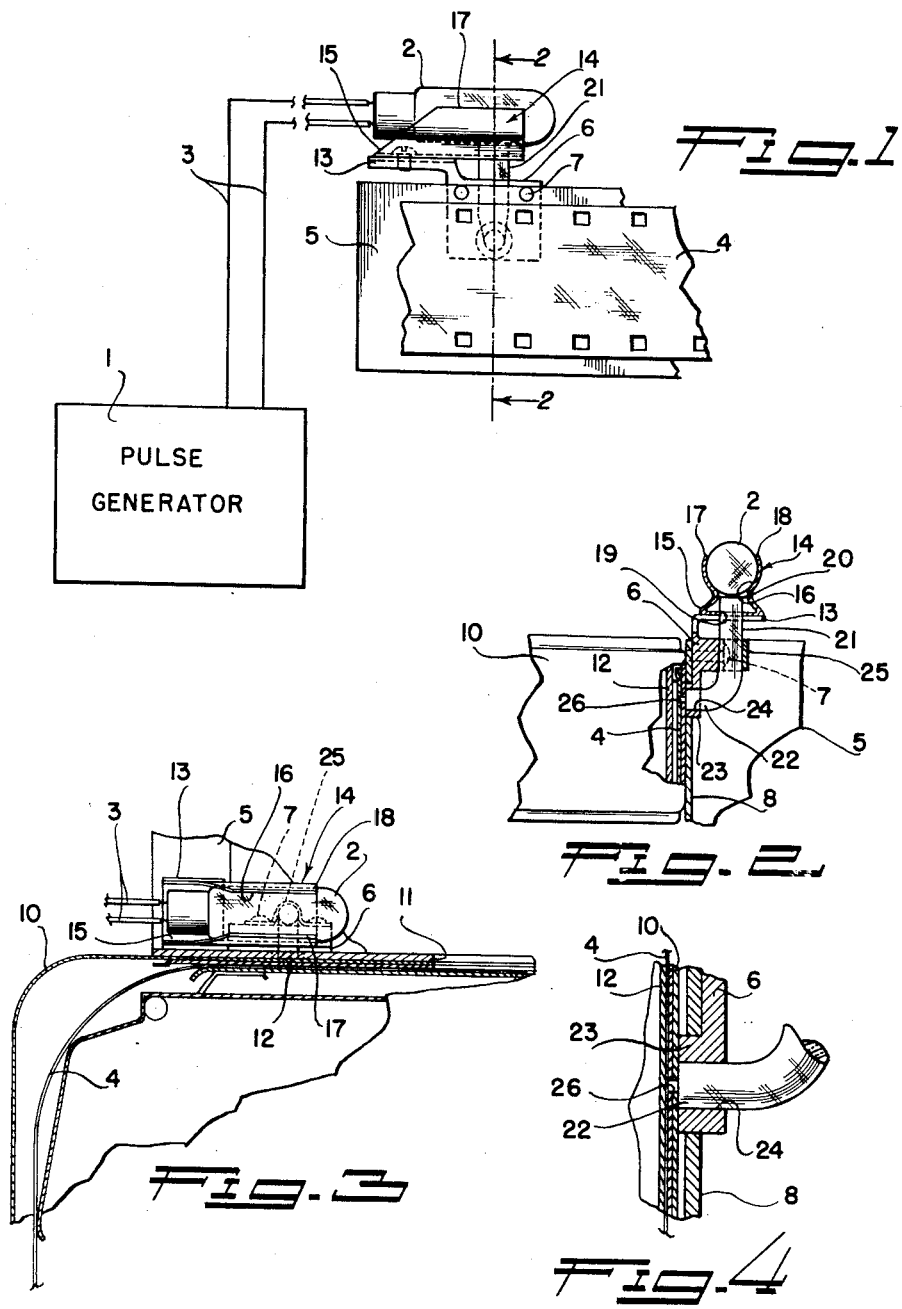
INVENTOR.
JAMES T. PATH
BY
George C. Sullivan
Agent United States Patent Office 2,952,504
Patented Sept. 13, 1960

2,952,504
FILM TIMING MARKER GENERATOR

James T. Path, Van Nuys, Calif., assignor to Lockheed Aircraft Corporation, Burbank, Calif.

Filed July 13, 1956, Ser. No. 597,784

3 Claims. (Cl. 346—107)

This invention relates to film timing marker generators for motion picture cameras and more particularly to an optical arrangement for exposing timing marks on a film strip with a remotely located lamp in response to the application of energy pulses from a pulse generator.

It is often necessary in the use of motion picture cameras in research and development work to provide means for accurately indicating film speed so that the events being photographed may be referenced with respect to time. This may be accomplished by generating accurately spaced pulses of light and applying those light pulses to the film so that it will exhibit an identifiable timing mark at accurately spaced intervals of time. The space and weight limitations of such equipment is most critical. It should be suitable for packaging within the camera itself and operate with low power requirements and high reliability in the presence of rugged environmental conditions.

It is an object of this invention to provide a film timing marker generator which by virtue of its construction will permit remotely locating the light source relative to the film strip whereby the generator may be packaged within the available space of a motion picture camera generally without modifying its external configuration of the camera mechanism. This is not only important in the use of the timing marker generator on existing motion picture cameras, but also on those cameras specifically designed to incorporate means for placing timing markers on the film since it is essential to build the camera into a small light weight package and to avoid compromising a design to accommodate provisions for marking the film.

It is another object of this invention to provide a film timing marker generator which is dependable in operation under rugged environmental conditions.

Still another object of this invention is to provide a film timing marker generator which is suitable for use with either black and white or color film to produce a small but clearly defined mark on the film without introducing stray light blurring the picture image.

Further and other objects will become apparent from a reading of the following description, especially when considered in combination with the accompanying drawing wherein like numerals refer to like parts.

In the drawing:

Figure 1 is a side view showing the film timing marker generator;

Figure 2 is a sectional view taken on line 2—2 of Figure 1;

Figure 3 is a fragmentary plan view showing the film timing marker light transmitting device; and Figure 4 is an enlarged fragmentary sectional side view showing the timing marker exposure opening.

Referring to Figure 1, the film timing marker generator includes a pulse generator 1 for producing electrical energy pulses which are applied to a lamp 2 through leads 3. Pulse generator 1 may be of conventional design such as a multivibrator which will produce pulses at a nearly constant repetition rate and maintain a pulse duration adequate for exposing the film strip 4 carried in camera 5. The desired pulse duration and repetition rate of course depends upon the type of film being used and upon the operating frame rate of the camera.

As most clearly shown in Figures 1 and 2, a mounting block 6 is suitably secured by screws 7 or the like to a bulkhead 8 inside the camera abutting film magazine 10 and at a location where the film strip is confined close to the wall of the magazine. Film strip 4 is usually supported close to the wall of magazine 10 as indicated in Figure 3 by a suitable guide 12 only in the vicinity of the main viewing slot 11 and therefore mounting block 6 would normally be located near the viewing slot. However, if the film were supported near the wall of the magazine at another point along its path of movement, block 6 could be mounted at that point rather than adjacent the regular camera film exposure slot.

A tube mounting bracket 13 is secured to suitable structure such as mounting block 6 for supporting lamp 2 in a holder 14. The base 15 of holder 14 is shaped to form a cavity 16 for collecting light generated by lamp 2. The lamp is received in the holder adjacent cavity 16 by a pair of spring loaded arms 17 and 18 curved to mate with the envelope of the lamp. The walls of cavity 16 are light reflective so as not to absorb substantial amounts of light energy from the lamp.

There is no specific type of lamp which must be used in the film timing marker generator, though bulbs containing neon, argon or xenon as the light producing element are preferred.

An opening 19 is formed in base 15 of holder 14 opposite lamp 2 for receiving one end 20 of a light probe 21. As best shown in Figure 2, end 20 of probe 21 projects into cavity 16 and terminates adjacent lamp 2 so that a maximum amount of light energy from the lamp may be absorbed by the probe. The exit end 22 of probe 20 as best shown in Figure 4 projects through bulkhead 8 to seatingly engage the outer wall of magazine 10. As shown in the drawing, mounting block 6 is provided with a detent 23 which, like probe 21, extends slightly beyond the opposite side of the camera bulkhead 8. Detent 23 absorbs the loads produced by the magazine when it is forced towards bulkhead 8 to seatingly engage end 22 of the probe. An opening 24 in mounting block 6 generally concentrically arranged with respect to detent 23 receives the exit end 22 of the probe and provides support therefor. Additional support for probe 21 is provided by a hold-down strap 25 secured to mounting block 6 intermediate of the ends of the probe. Strap 25 prevents probe 21 from moving relative to mounting block 6 and out of seating engagement with magazine 10.

Probe 21 is made of a transparent plastic material such as Lucite or polystyrene having a high index of refraction. Both ends of the probe are highly polished as well as the portion of the sidewall which projects into cavity 16. The remaining portion of the external surface of the probe is silvered to provide a confined channel through which the light from lamp 2 may be transmitted to film strip 4. By leaving the portion of the probe which projects into cavity 16 uncoated, the light collected in the cavity will materially increase the total quantity of light received by the probe from lamp 2.

Film magazine 10 is provided with an opening 26 formed therein at a location near the main exposure opening 11 as indicated in Figures 3 and 4 where the film strip 4 is supported for movement by guide member 12 along a path contiguous in the wall through which opening 26 is formed in the magazine. As best shown in Figure 4 opening 26 is arranged generally concentric with the exit end 22 of probe 21 and it is smaller in diameter than the probe by an amount which will vary with a particular design. In any case, opening 26 should be at least 10 percent smaller in diameter to serve as a light stop blocking the outer portion of the column of light defined by the probe. This is important in producing a sharp mark at the film since the light intensity at the exit end of probe 21 will decrease radially outwardly from the center line of the probe due to absorption of light by the silver coating on the probe and other losses inherent in the probe material itself.

As best shown in Figure 4 the exit end 22 of probe 21 projects slightly beyond the magazine side of bulkhead 8 as does detent 23 on mounting block 6. One of the main purposes for this construction is to insure a light-tight coupling between probe 21 and opening 26 in film magazine 10. By this means, efficient light transmitting is accomplished for placing distinct timing markers on the the film strip by light from a remotely located source. Blurring of the picture image due to loss of light from the probe is also avoided.

The light transmitting device as well as the pulse generator may be packaged in a very small amount of space inside the camera and arranged to operate in response to operation of the camera. With the camera operating, pulse generator produces energy pulses at predetermined time intervals for lighting lamp 2. Much of the light emitted by the lamp is collected within cavity 16 of the lamp-holder for reception by probe 21. The end 20 projecting into cavity 16 being uncoated provides a large total probe area for gathering the light in the cavity. The light picked up by probe 21 is directed to exit end 22 where the central area of the column of light in the probe is allowed to pass through opening 26 in magazine 10 and expose the film strip 4 to produce a timing marker. The duration of the light pulse must be adequate to expose the film with the available light intensity, but not so long as to blur the marker due to movement of the film during camera operation. The permissible maximum pulse duration to avoid blurring of the timing marker is primarily a function of the camera frame rate. Thus, it is obvious that the film timing marker generator must be optically efficient in order to provide the light intensities required for properly marking the film on high frame rate cameras used in research work if the other requirement of the generator, that is, that it be a small lightweight package which may be housed within the confines of the camera itself, is to be met. This efficiency is obtained with the device described herein for transmitting light from a remotely located lamp to the film strip.

As the camera operates to record a sequence of events on the film strip, accurately spaced light pulses from lamp 2 provide a series of timing marks on the film strip through the optical probe 21. Knowing the time between pulses or timing markers on the film strip, the sequence of events recorded by the camera may be accurately referenced with respect to time even though the camera operating frame rate may have varied considerably due to the environmental conditions in which the camera was operated, such as in extremely high or low temperatures or under high acceleration loads.

The light stop provided by magazine opening 26 at the exit end 22 of probe 21, as well as the use of detent 23, insures a good coupling between probe 21 and opening 26 of the magazine for exposing the film, even though slight relative movement between the camera and the magazine may occur during operations due to high acceleration loads. Furthermore, the flush type engagement of magazine 10 with probe 21 allows ready installation and removal of the film magazine from the camera.

It should be understood that certain alterations, modifications and substitutions may be made to the instant disclosure without departing from the spirit and scope of the invention as defined by the appended claims.

I claim:

1. A film timing marker generator for marking motion picture film during camera operation comprising, a pulse generator generating voltage pulses at predetermined intervals, a lamp responsive to said voltage pulses for producing light pulses, a combined lamp holder and light collecting chamber for mounting said lamp on one side of said chamber, the other side of said chamber having an opening therein, an optical probe having one end thereof projecting through said opening and into said chamber, said one end having a clear and highly polished surface terminating adjacent said lamp so that a maximum amount of light is absorbed by said probe and the other end of said probe located closely adjacent the film, and a partition interposed between the probe and the film and having an opening formed therein smaller in size than the adjacent end of the probe whereby a substantially uniform quantity of light from said lamp may be directed through the partition opening and onto the film even in the presence of limited relative movement between the probe and partition.

2. A film timing marker generator for motion picture cameras having light sensitive film stored therein comprising, means generating voltage pulses at predetermined time intervals, a lamp responsive to said voltage pulses for producing light energy pulses, a holder for said lamp, said holder including a light reflecting cavity receiving light from said lamp, said holder having an opening formed therein opposite said lamp and communicating with said cavity, and an optical probe having a high index of refraction projecting through said opening into said cavity and terminating adjacent said lamp and directing light from said cavity to said film, the portion of said probe which extends into said cavity having a highly polished and clear surface.

3. A motion picture camera having a film strip and means providing timing markers on the film strip comprising means generating uniformly spaced voltage pulses, a lamp responsive to said voltage pulses for producing light energy pulses, a partition between the film strip and lamp, a light collecting cavity having a base and side walls depending therefrom, holding means attached to said side walls for resiliently holding said lamp on one side of said cavity and spaced from said base, an opening in said base, an optical probe having a high index of refraction, one end of said probe projecting through said opening and into said cavity and terminating adjacent said lamp, the opposite end of said probe seatingly engaging said partition, said partition having an opening formed therein through which light from said probe is transmitted to said film strip, said opening being smaller than the cross-section size of said probe at said partition for allowing only a portion of said probe to be effective in transmitting light through said opening, and light reflecting means surrounding said probe only between the cavity and said opposite end, said ends and that portion of the probe which projects into said cavity having clear and highly polished surfaces whereby said probe will efficiently gather light from said lamp and produce a distinct mark on the film at predetermined time intervals.

References Cited in the file of this patent

UNITED STATES PATENTS

| Number | Name | Date |
| --- | --- | --- |
| 1,642,187 | Young | Sept. 13, 1927 |
| 1,663,308 | Jenkins | Mar. 20, 1928 |
| 1,800,277 | Boerstler | Apr. 14, 1931 |
| 1,965,865 | Thompson | July 10, 1934 |
| 2,368,839 | Jansen | Feb. 6, 1945 |
| 2,458,882 | Stoner et al. | Jan. 11, 1949 |
| 2,567,036 | Shannon | Sept. 4, 1951 |